Patented May 1, 1951

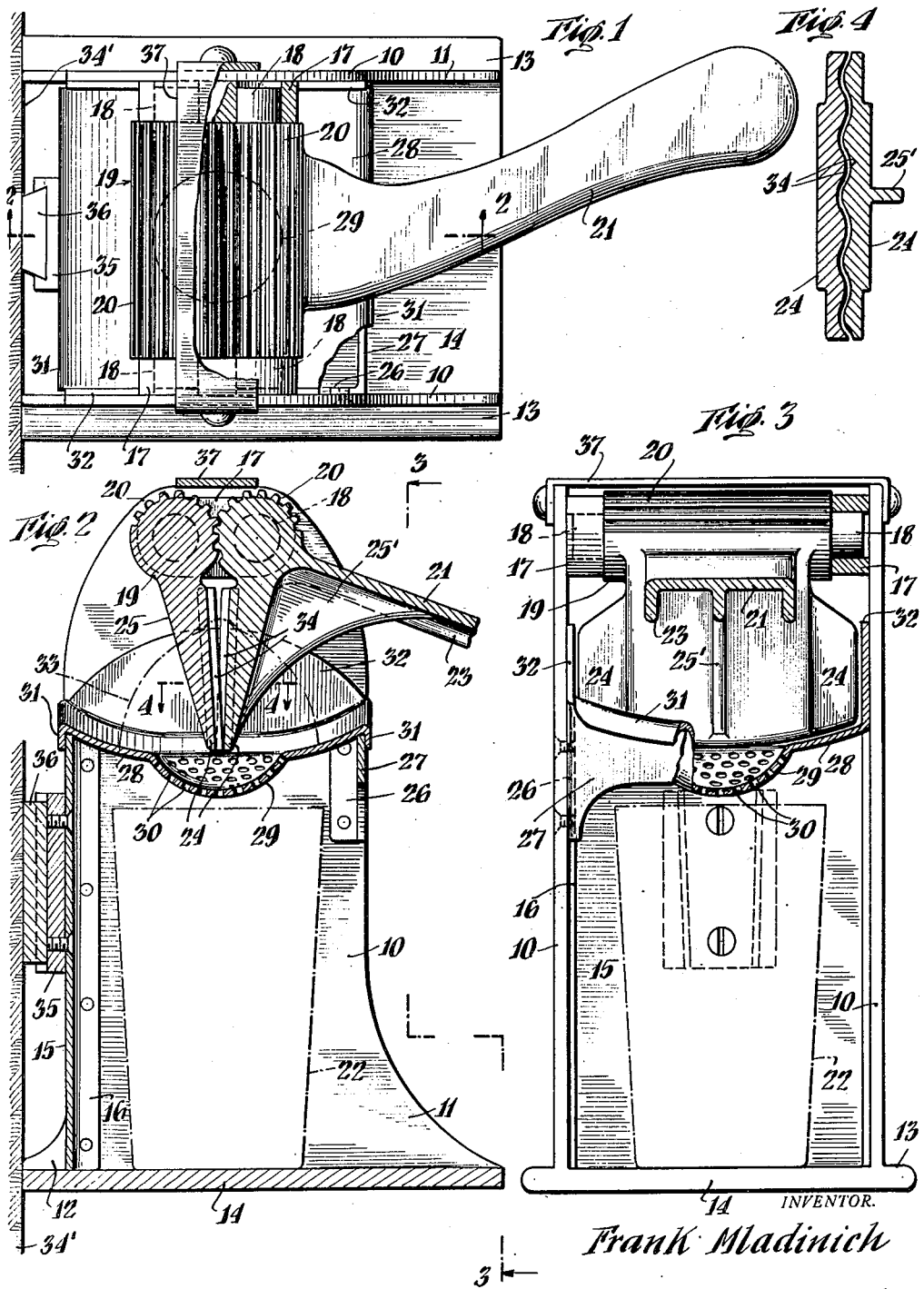

2,551,153

UNITED STATES PATENT OFFICE 2,551,153

FRUIT JUICE EXTRACTOR

Frank Mladinich, New York, N. Y.

Application September 7, 1946, Serial No. 695,453

5 Claims. (Cl. 100—41)

This invention relates to devices for extracting juice from fruit such as oranges, lemons, grapefruit and the like and it has for its principal object the production of a fruit juice extractor of simple and rigid construction which shall be adapted to effectively and expeditiously perform its juice-extracting function with a minimum of effort.

A further object of the invention is the production of a fruit juice extractor of the above character having mechanism by means of which the conventional manual squeezing operation of the fruit is simulated in contradistiction to a crushing operation which cracks and breaks the fruit resulting in probable loss of some of the extracted juice and making for an extremely untidy operation as a whole.

A further object of the invention is the provision in a fruit juice extractor of the above type of novel removable means for supporting the fruit and for receiving the discarded portions thereof such as the pulp and pits or seeds while permitting all of the extracted and filtered juice to flow into any suitable form of container or receptacle.

Further and other objects of the invention as well as additional advantages thereof will appear as the description of the invention proceeds, the invention consisting in the novel fruit juice extractor hereinafter more particularly described and then specified in the claims.

In the accompanying drawing illustrating a practical embodiment of the invention:

Fig. 1 is a plan view of the improved fruit juice extractor of the invention.

Fig. 2 is a horizontal section on the line 2—2 of Fig. 1.

Fig. 3 is a vertical cross-section (partially broken away) on the line 3—3 of Fig. 2 and Fig. 4 is a horizontal section on the line 4—4 of Fig. 2.

Referring in detail to the several figures of the drawing:

Two substantially parallel side members or walls of a frame are indicated at 10 and they are gradually widened adjacent their lower ends, forwardly thereof as at 11 and rearwardly as at 12, to give stability to the frame. Said side walls 10 are also provided at their lower ends with right-angled supporting flanges 13 and a supporting base 14 which connects said side walls together and which may be integral therewith. A rear wall 15 is provided and is flanged at its vertical edges as at 16, which flanges snugly engage the side walls 10 to which they may be fastened by any suitable means as by the screws as shown.

The upper ends of the side walls 10 may be dome-shaped in side elevation as shown in Fig. 2. Carried in any manner by said dome-shaped portions are the oppositely disposed bearing members 17 in which are journalled the pintles or hubs 18 of rollers 19 having elongated intermeshing teeth 20 extending longitudinally thereof substantially throughout their lengths and partially around their circumferential surfaces whereby rotation of one roller in one direction will effect a rotation of the other roller in the opposite direction as is obvious. An actuating lever or handle for simultaneously rotating said rollers 19 is indicated at 21 and it is securely fastened to one of said rollers in any desirable manner and preferably centrally of the roller. Said handle 21 extends in an angular direction at a substantial angle to the longitudinal axis of the roller to insure a space of sufficient width, when the handle is in lowermost position, between the handle and a side wall 10 to permit of the placement of a juice-receiving glass or other container 22 on the supporting base 14 or for the removal of the glass from said base. The operating handle is provided with an inwardly projecting continuous flange 23 around its edge to facilitate the gripping thereof and to eliminate sharp edges thereon.

The numeral 24 indicates two cooperating presser plates the outer sides of which and centrally thereof are strengthened and reinforced by outwardly inclined solid portions or reinforcements 25 which may be integral with said presser plates and the widened or thickened upper portions thereof which are subjected to most of the strain when the plates are forced into operating position are attached in any manner to or made an integral part of the rollers 19. The central portions of said plates and their reinforcements, accordingly, may be said to have the general configuration in cross-section of elongated right-angled triangles. This construction makes for a very substantial connection of considerable strength between the presser plates and rollers and permits relatively great pressure to be exerted by the pressure plates against any object interposed therebetween when pressure is applied downwardly on the actuating handle 21. A strengthening rib 25' of the configuration shown is also provided which connects the under side of the operating lever or handle 21 and the reinforced portion 25 of the adjacent presser plate and which assists materially in providing a compact and strong construction and in relieving the operating handle of considerable of the strain to which it is subjected when it is moved or brought downwardly to force the presser plates towards each other and into juice-extracting position.

Fastened to each side wall 10 in any desirable manner are brackets 26 provided with a connecting strip 27 connecting the side walls together and the upper edge of which in conjunction with the upper edge of the rear wall 15 provide supports for a removable concaved fruit-supporting tray 28 having a cup 29 preferably integral therewith and disposed centrally thereof, said cup being provided with a plurality of spaced perforations or openings 30 therein. Said tray 28 is provided with front and rear flanges 31 constituting hooks which extend over and frictionally engage the upper edges of the connecting strip 27 and rear wall 15 to normally prevent dislodgment of the tray from its operative position. Said tray is also provided with side flanges 32 extending upwardly from the tray parallel to and preferably slidably interfitting with the side walls 10 and which have the function of directing splattering extracted juice from the squeezed fruit into the tray 28 from which it flows into cup 29 and thereby preventing it from dripping or running down the side walls 10.

To perform the juice-extracting operation, the fruit, such as an orange, lemon or grape-fruit is cut approximately in half and one half is placed face downwardly, as indicated in dotted lines at 33 in Fig. 2, centrally over the tray 28 and over the perforated cup 29 thereof, after the operating lever or handle 21 has been raised upwardly to open or spread the presser plates 24 apart in an obvious manner. The lever is thereupon pressed downwardly to force the presser plates 24 towards each other and enable them to engage opposite sides of the fruit 33 to squeeze the same and thereby extract or force the juice from the fruit by a squeezing operation. The extracted juice then flows from the tray 28 and into the cup 29 and through its perforations and into the glass or container 22, the cup meanwhile retaining the pulp and pits or seeds of the fruit which may be readily discarded after removal of the tray 28 from its supports. To facilitate the juice-extracting operation the inner faces of the presser plates 24 substantially throughout their widths are provided with interfitting vertically extending channels, corrugations or flutings 34 which firmly grip the fruit and permit extracted juice to flow downwardly therethrough and into the cup 29 and through its perforations.

In some cases it may be desirable to hang the device on a wall 34' or other support. For that purpose a bracket or fastening device 35 of any suitable construction is secured to the rear wall 15 and it is adapted to detachably cooperate with an interfitting bracket 36 attached to said wall 34'. A metallic strip or plate 37 is also provided which connects together the upper edges of the dome-shaped portions of the side walls 10 and which spans the intersecting teeth of the rollers 19 to prevent dust and dirt from falling therebetween and consequent possible clogging thereof. Said strip or plate 37 may also provide a stop to limit the upward movement of the operating handle 21, the downward movement of said lever or handle being limited by engagement of the presser plates with each other. In addition, said strip or plate 37 may conveniently serve the purpose of a name plate for the inscription of the name of the manufacturer of the device and for its trade-mark as well and if so desired.

The invention claimed is:

1. In a fruit juice extractor, a base, a pair of substantially parallel and spaced side walls connected to said base and extending upwardly therefrom, roller members extending transversely of and rotatably supported by said side walls and provided with elongated intermeshing teeth extending longitudinally thereof, a removable and horizontally disposed fruit-supporting tray provided with perforations therein and supported intermediate said side walls and over said base, an actuating lever connected to one of said roller members for rotating said members in opposite directions, and pressure devices connected to said roller members and simultaneously movable from and towards each other for applying pressure to a fruit from opposite directions when downward pressure is exerted against said actuating lever.

2. In a fruit juice extractor, a base, a pair of parallel side walls connected to said base and extending upwardly therefrom, roller members extending transversely of and supported by said side walls and provided with intermeshing teeth extending longitudinally of said members, a concaved, horizontally disposed and removable fruit-supporting plate supported intermediate said base and said roller members and provided with a perforated cup integral therewith and extending downwardly therefrom substantially centrally thereof, an actuating lever connected to one of said roller members for rotating said members in opposite directions, and pressure plates carried by said roller members and simultaneously movable from and towards each other for applying pressure to a fruit from opposite sides thereof when downward pressure is exerted against said actuating lever.

3. In a fruit juice extractor, a pair of supporting side walls, roller members supported by said side walls and provided with elongated intermeshing teeth extending longitudinally thereof, a base connecting said side walls, supporting elements connected to said side walls at the forward and rearward ends thereof and intermediate said roller members and said base, a concaved and removable fruit-receiving tray having flanged hooks engaging the upper free edges of said supporting elements and provided with an integral perforated cupped portion extending downwardly therefrom and positioned substantially centrally thereof, flanges extending upwardly from said tray and lying adjacent said side walls, an actuating lever connected to one of said roller members for rotating said members in opposite directions, and pressure devices connected to said roller members for applying pressure to a fruit from opposite sides thereof when downward pressure is exerted against said actuating lever.

4. In a fruit juice extractor, a pair of supporting side walls, bearing members carried by said side walls, a pair of elongated rollers having intermeshing teeth extending longitudinally thereof, hub members on said rollers journalled in said bearing members, presser plates positioned between said side walls and having reinforced thickened portions integral with said rollers and provided with cooperating corrugations extending vertically thereof, and an actuating lever connected to one of said rollers and one of said presser plates and substantially centrally of said roller and presser plate and adapted to simultaneously rotate said rollers in opposite directions and force said presser plates to exert pressure against opposite sides of a fruit when downward pressure is exerted against said actuating lever.

5. In a fruit juice extractor, a pair of side walls, bearing members carried by said side walls, a pair of elongated rollers journalled in said bearing members and provided with intermeshing teeth extending longitudinally of said rollers, a pair of presser plates connected to said rollers and movable towards each other into squeezing posiiton against opposite sides of a fruit, a perforated tray supported between said side walls and beneath said presser plates, a lever connected to one of said rollers for simultaneously rotating said rollers in opposite directions to actuate said presser plates when pressure is exerted downwardly against said lever, and a plate connecting said side walls and extending over the intermeshing teeth of said rollers and acting as a stop to limit the movement of said lever.

FRANK MLADINICH.

REFERENCES CITED

The following references are of record in the file of this patent:

UNITED STATES PATENTS

| Number | Name | Date |
| --- | --- | --- |
| 620,142 | Jaques | Feb. 28, 1899 |
| 1,098,288 | Mosteller | May 26, 1914 |
| 1,452,270 | Gray | Apr. 17, 1923 |
| 1,886,250 | Bungay | Nov. 1, 1932 |

FOREIGN PATENTS

| Number | Country | Date |
| --- | --- | --- |
| 33,229 | France | Mar. 27, 1928 |